2 Sheets--Sheet 1.

R. S. SQUIRES.
Dinner-Pails.

No. 135,946. Patented Feb. 18, 1873.

Witnesses.
C. Carr,
A. F. Cornell.

Inventor.
R. S. Squires
Per. Burridge & Co.
Attys.

R. S. SQUIRES.
Dinner-Pails.

No. 135,946. Patented Feb. 18, 1873.

Witnesses.
C. Carr
A. J. Cornell.

Inventor.
R. S. Squires
Per. Burridge & Co.
Attys.

UNITED STATES PATENT OFFICE.

ROWLIN S. SQUIRES, OF CLEVELAND, OHIO.

IMPROVEMENT IN DINNER-PAILS.

Specification forming part of Letters Patent No. 135,946, dated February 18, 1873.

*To all whom it may concern:*

Figure 1:
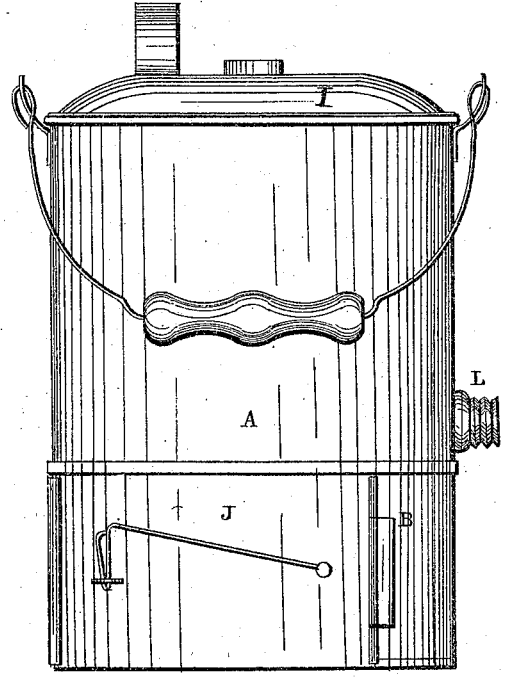
Figure 2:
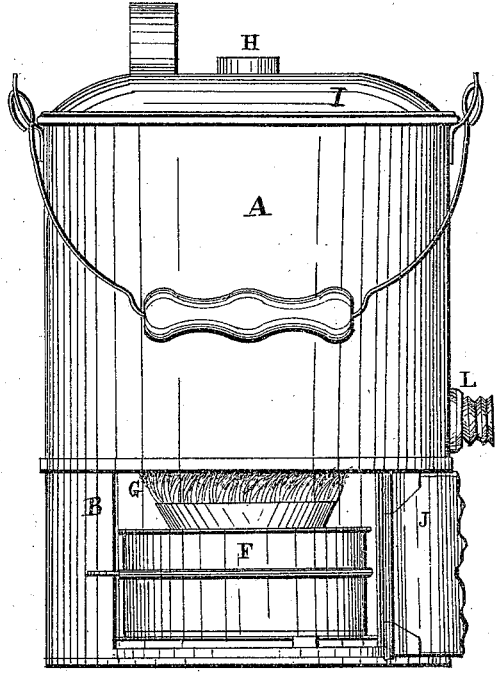
Figure 3:
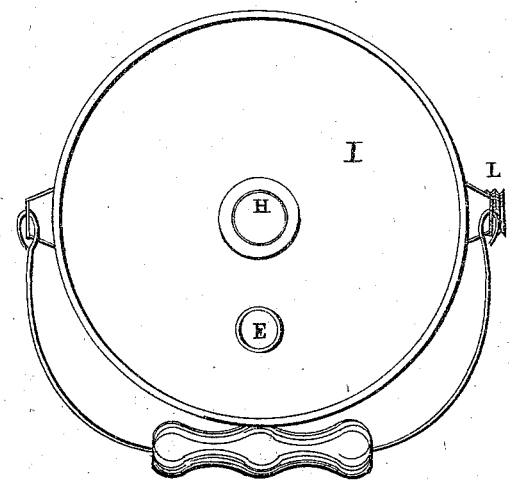
Figure 4:
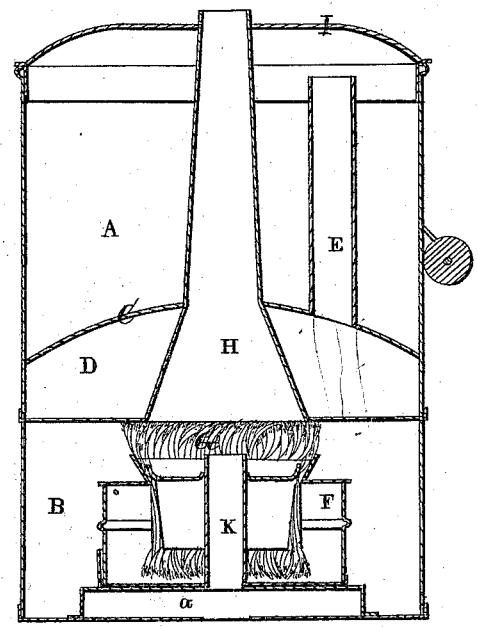

Be it known that I, ROWLIN S. SQUIRES, of Cleveland, in the county of Cuyahoga and State of Ohio, have invented a certain new and Improved Dinner-Pail, of which the following is a description:

Figure 1 is a side view of the pail. Fig. 2 shows an inside view of the lower part of the pail. Fig. 3 is a top view. Fig. 4 is a vertical transverse section.

Like letters of reference refer to like parts in the several views.

The nature of this invention relates to a dinner-pail; and the object of the same is to warm the articles therein by means of a lamp arranged in a lower section of the pail immediately under a boiler containing the coffee or other beverage for dinner.

Of the above-specified pail the following is a more full and detailed description: The pail is constructed in two sections, A and B. The lower part of the upper section is set off therefrom by a diaphragm, C, Fig. 4, forming thereby a boiler, D, immediately over the lower section. Access is had to the boiler by means of a tube, E. In the lower section is arranged a lamp, F, having a circular wick, G. H is the chimney of the lamp, the lower part of which is surrounded by the boiler, as shown in Fig. 4; whereas the upper end extends through the cover I, as shown. J, Fig. 1, is a door, whereby access is had to the inside of the lamp-chamber for lighting and caring for the lamp. Through the center of the lamp passes a tube, K, for the supply of air thereto, and which tube is open to the outside by means of a hole in the bottom of the pail, and to the chamber or section in which the lamp is by the space *a* immediately under it, caused by the lamp being raised above the bottom of the pail.

The practical use of the above-described pail is in this wise: The solid articles of food are placed in the upper section around the chimney and tube H E. The coffee or other drink is poured into the boiler through the tube E. In order to warm the coffee and other articles in the pail the lamp is lighted, which, in a few minutes, heats the coffee, which in turn communicates heat to the articles above. By this communicated heat and that which passes up the chimney the solid contents of the dinner is quickly warmed; and, if so desired, the heat can be increased to such a degree as to cook raw food put therein. The coffee is drawn from the boiler through the side nozzle L, to which a small faucet can be attached.

Claim.

What I claim as my invention, and desire to secure by Letters Patent, is—

The sections A B, boiler D, tube E, and chimney H, combined with the heating device F, G, and K, all arranged substantially as and for the purpose specified.

ROWLIN S. SQUIRES.

Witnesses:
W. H. BURRIDGE,
JULIUS SCHELDT.